United States Patent [19]
Yamamoto et al.

[11] Patent Number: 5,799,412
[45] Date of Patent: Sep. 1, 1998

[54] DRYING SOLID POLYMER APPARATUS

[75] Inventors: Ryoichi Yamamoto; Satoru Ohtani; Toshimi Hachimori; Teruhisa Kojima; Takahiro Mamyoda, all of Kuga-gun, Japan

[73] Assignee: Mitsui Petrochemical Industries, Ltd., Tokyo, Japan

[21] Appl. No.: 832,505

[22] Filed: Apr. 3, 1997

[30] Foreign Application Priority Data

Apr. 11, 1996 [JP] Japan .................. 8-089793

[51] Int. Cl.$^6$ .................................. F26B 17/00
[52] U.S. Cl. .................. 34/582; 34/588; 34/130; 34/168
[58] Field of Search .................. 34/359, 360, 372, 34/374, 130, 137, 168, 578, 582, 586, 588; 526/65, 66, 78

[56] References Cited

U.S. PATENT DOCUMENTS

| | | |
|---|---|---|
| 3,969,546 | 7/1976 | Saeman ................. 427/213 |
| 4,372,758 | 2/1983 | Bobst et al. . |
| 4,420,592 | 12/1983 | Kato et al. .............. 526/65 |
| 4,627,174 | 12/1986 | Hedden et al. ......... 34/168 X |
| 4,758,654 | 7/1988 | Brod et al. . |
| 5,052,123 | 10/1991 | Tischendorf et al. ... 34/168 X |
| 5,376,742 | 12/1994 | Krause . |

FOREIGN PATENT DOCUMENTS

| | | |
|---|---|---|
| 0341540A2 | 11/1989 | European Pat. Off. . |
| 0683176A1 | 11/1995 | European Pat. Off. . |
| 1560940 | 2/1980 | United Kingdom . |

*Primary Examiner*—Henry A. Bennett
*Assistant Examiner*—Steve Gravini
*Attorney, Agent, or Firm*—Birch, Stewart, Kolasch and Birch, LLP

[57] ABSTRACT

Drying of a solid polymer is disclosed in which a solid polymer obtained by polymerization (or a product of modification of the solid polymer) is contacted with a drying gas so that any solvent and/or unreacted polymerization feed materials remaining in the solid polymer are removed to thereby dry the solid polymer, and in which a gaseous polymerization feed material is used as the drying gas and contacted with the solid polymer to thereby dry the solid polymer (step i), and the resultant solid polymer is contacted with a drying gas which contains an inert gas (step ii). The drying gas can be recovered from the step (i) and part thereof can be recycled through a polymerization step as it is or be recycled, after cooling the drying gas to thereby remove any condensed components, to the step (i). Not only can the solid polymer be efficiently dried but also the solvent and unreacted polymerization feed materials recovered from the solid polymer can efficiently be recycled by the disclosed method.

11 Claims, 5 Drawing Sheets

Fig.5

DRYING SOLID POLYMER APPARATUS

FIELD OF THE INVENTION

The present invention relates to a method of drying a solid polymer by removing any solvent and/or polymerization feed materials therefrom to thereby dry the same and a drying apparatus capable of efficiently performing the drying.

BACKGROUND OF THE INVENTION

The solid polymer obtained by polymerization generally contains unreacted polymerization feed materials and solvents employed in the polymerization. For example, the powdery olefin polymer (LLDPE) obtained by a vapor phase polymerization of ethylene and 1-hexene contains 1-hexene as a polymerization feed material, a diluent used in the polymerization, a catalyst slurry solvent, etc.

The above solid polymer containing unreacted polymerization feed material has the danger of explosion at the time of molding or use thereof. Further, the diffusion of unreacted polymerization feed material and solvent contained in the solid polymer into the atmosphere is not favorable from the viewpoint of environmental protection. Therefore, it is a common practice to subject the solid polymer obtained by polymerization to a drying step in which any solvent and unreacted polymerization feed materials remaining in the solid polymer are removed with the use of a drying gas.

In the liquid phase polymerization such as the slurry polymerization or solution polymerization, the obtained polymer fluid is preliminarily dried by, for example, the centrifugal separation or flash drying to thereby obtain the solid polymer, which is dried with the use of a drying gas as mentioned above.

In the above drying of the solid polymer, air or an inert gas such as nitrogen is used as the drying gas. For example, Japanese Patent Publication No. 62(1987)-47441 describes a method in which an olefin polymer is carried into a drying vessel with the use of a gas (inert gas) which is inert to monomers and contains substantially no oxygen and the olefin polymer is countercurrently contacted with the drying gas (inert gas) to thereby remove unpolymerized gaseous monomers from the solid olefin polymer while recycling part of the drying gas to the drying vessel. Further, Japanese Patent Publication No. 7(1995)-5661 proposed a method in which, in the drying of a polyolefin, a gas containing water is used as the drying gas to thereby carry out deactivation of the catalyst used in the polymerization simultaneously with the drying of the polyolefin.

Thus, the recycling of the drying gas (inert gas) to the drying vessel is known with respect to the drying of the solid polymer.

In this connection, the inert gas recovered after drying contains solvent and unreacted polymerization feed materials, so that recycling of the inert gas to the reaction system would enable effective utilization of the solvent and polymerization feed materials. However, recycling of the drying gas recovered in the drying step as it is to the reaction system would cause mixing of a large volume of inert gas in a polymerizer concurrently with the introduction of the solvent and polymerization feed materials, so that the inert gas which is not consumed by the polymerization reaction is accumulated to thereby lower the polymerization efficiency. This inert gas is withdrawn by blowoff of all gases from the polymerizer, which is not only economically disadvantageous but also unfavorable from the viewpoint of air pollution, etc.

Therefore, it is desirable to separate the solvent and/or unreacted polymerization feed materials recovered in the drying step from the inert gas before effecting recycling to the polymerization system, and it is contemplated to perform such separation by, for example, the super-cold separation or adsorption separation. However, huge cost is inevitable in recycling the unreacted polymerization feed materials recovered by executing the above separation. Accordingly, the solvent and unreacted polymerization feed materials recovered from the drying step have occasionally been incinerated or discarded without conducting separation and recycling.

As mentioned above, the solvent and/or unreacted polymerization feed materials recovered in the drying step have ineffectively been disposed of, and the development of a method of effectively recovering and recycling them is strongly demanded from the viewpoint of effective utilization of polymerization feed materials and from the viewpoint of environmental protection.

OBJECT OF THE INVENTION

The present invention has been made in view of the above prior art, and the object of the present invention is to provide a method of drying a solid polymer, which method enables not only efficient drying of the solid polymer but also efficient reutilization of the solvent and/or unreacted polymerization feed materials recovered from the solid polymer, and to provide a drying apparatus capable of efficiently carrying out the above drying.

SUMMARY OF THE INVENTION

The method of drying a solid polymer according to the present invention comprises:

contacting a solid polymer obtained by polymerization (or a product of modification of the solid polymer) with a drying gas so that any solvent and/or unreacted polymerization feed materials remaining in the solid polymer are removed to thereby dry the solid polymer, wherein said drying gas-contacting treatment comprises:

(i) contacting said solid polymer with a gaseous polymerization feed material as a drying gas to thereby dry the solid polymer, and         (ii) contacting the resultant solid polymer with an inert gas-containing drying gas.

It is preferred that a solvent and unreacted polymerization feed materials remain in the solid polymer to be treated in the step (i) in an amount of 20% by weight or less.

Part or whole of the drying gas recovered from the step (i) can be recycled to a polymerization step.

Part of the drying gas recovered from the step (i) can be recycled to the step (i). The drying gas recycled to the step (i) may contain hydrogen.

The inert gas contained in the drying gas supplied to the step (ii) is, for example, helium, nitrogen, argon, neon or a mixture thereof, and the drying gas may contain oxygen in an amount of not greater than 5%.

The drying gas supplied to the step (ii) may contain gaseous or liquid water. The drying gas may have a water content of 0.1 to 70% by weight.

In the present invention, it is preferred that each drying gas be countercurrently contacted with the solid polymer.

In the above present invention, the drying gas recovered from the step (i) can be recycled to a polymerization step. Alternatively, the recovered drying gas can be cooled to thereby remove condensed components, followed by recycling of part thereof to the step (i).

The apparatus for drying a solid polymer according to the present invention comprises:

a drying vessel, a solid polymer supply port (b) disposed in the vicinity of a top of the drying vessel, a first drying gas supply port (c) disposed in a position below the solid polymer supply port (b) for supplying a first gas containing a gaseous polymerization feed materials, a first drying gas-discharging port (a) disposed at the top of the drying vessel for discharging the first drying gas which has been countercurrently contacted with the solid polymer, a second drying gas supply port (d) disposed in the vicinity of a bottom of the drying vessel for supplying a second drying gas containing an inert gas, a second drying gas collector D arranged within the drying vessel in a position between the first drying gas supply port (c) and the second drying gas supply port (d) for collecting the second drying gas which has been countercurrently contacted with the solid polymer, a recovery pipe line E extending from the second drying gas collector D to outside the drying vessel for leading the second drying gas which has been collected by the second drying gas collector D outside the drying vessel, and a solid polymer discharge port (e) disposed at the bottom of the drying vessel for recovering the solid polymer which has been dried by the countercurrent contact with the first drying gas and the second drying gas, wherein the second drying gas collector D separate inside of the drying vessel so that a zone for contacting the solid polymer with the first drying gas is defined above the second drying gas collector D and that a zone for contacting the solid polymer with the second drying gas is defined below the second drying gas collector D.

It is preferred that the recovery pipe line E have a second drying gas recovering end positioned in the vicinity of a lower part of the second drying gas collector D.

The drying vessel is preferred to be a hopper-type drying vessel having a cylindrical body part provided at its top with a domed part and at its bottom with a hopper port having a reversed conical form.

The second drying gas collector D may be composed of a protrudent plate disposed protrudently from an inner wall of the drying vessel toward a center axis of the drying vessel, the above protrudent plate having an opening at its center.

The protrudent plate may have an inverted conical or inverted polygonal pyramid form having an opening at its apex. Further, the protrudent plate may comprise a disc form body having an opening at its center and a cylindrical part which extends below from the vicinity of the opening.

In the drying apparatus of the above structure, it is preferred that a ratio of $D_4/D_1$, in which $D_1$ represents an inside diameter of the cylindrical part and $D_4$ represents a minimum inside diameter of the opening of the second drying gas collector D, range from 0.3 to 0.8.

The second drying gas collector D may be composed of an umbrella shaped collecting member arranged in a center of the drying vessel so as to provide a spacing between an outer peripheral part of the umbrella shaped collecting member and an inner wall of the drying vessel.

The umbrella shaped collector D may have the form of a cone, a polygonal pyramid or a disc. In the drying apparatus of the above structure, it is preferred that a ratio of $D_2/D_1$, in which $D_1$ represents an inside diameter of the cylindrical part and $D_2$ represents a maximum inside diameter of the second drying gas collector D, range from 0.2 to 0.8.

The drying apparatus may comprises a greater diameter part having an inside diameter $D_5$ disposed between an cylindrical part having an inside diameter $D_1$ and a hopper part. It is preferred that the above $D_5$ be greater than the above $D_1$ and that a ratio of $D_1/D_5$ range from 0.2 to 0.7.

DETAILED DESCRIPTION OF THE INVENTION

The method of drying a solid polymer and drying apparatus according to the present invention will be described in detail below.

In the present invention, the term "polymerization" is occasionally used to collectively mean not only homopolymerization but also copolymerization, and the term "polymer" is occasionally used to collectively mean not only a homopolymer but also a copolymer.

Method of drying solid polymer

The method of drying a solid polymer according to the present invention comprises contacting a solid polymer obtained by polymerization (or a product of modification of the solid polymer) with a drying gas so that any solvent and/or unreacted polymerization feed materials remaining in the solid polymer are removed to thereby dry the solid polymer. Further, in the present invention, the drying gas contacting treatment comprises:

(i) contacting the solid polymer with a gaseous polymerization feed material as a drying gas to thereby dry the solid polymer, and (ii) the resultant solid polymer with an inert gas-containing drying gas.

In the present invention, the solid can be lumps which do not reunite with each other and is especially preferred to be powdery (including particulate form).

In the present invention, although the polymer subjected to drying is not particularly limited as long as it is solid and also the polymerization method and polymerization feed materials are not particularly limited, the solid polymer is preferred to be one produced from polymerization feed material which can be used as the drying gas described below and, in-particular, the polymerization feed material is preferred to have a boiling point of not higher than 20° C. at the atmospheric pressure.

The above solid polymer is, for example, a polyolefin. Suitable polyolefins are polymers derived from olefins having 2 to 10, preferably, 2 to 6 carbon atoms. Examples of such olefins include ethylene, propylene, 1-butene, 2-butene, isobutene and 1-hexene. The polyolefin may be any of homopolymers, random copolymers and block copolymers of these olefins.

Specific examples of the polyolefins include homopolyethylene, high density polyethylene (HDPE), a copolymer of ethylene and another α-olefin such as linear low density polyethylene (LLDPE), homopolypropylene, a block polypropylene and a random polypropylene. The above polyolefin comprising an olefin as a principal component may contain an appropriate amount of comonomer component such as a diene.

The above polyolefin may be produced with the use of an appropriate common polymerization catalyst such as Ziegler catalyst, metallocene catalyst or Phillips catalyst according to the customary polymerization method. With respect to the polymer produced by the liquid phase polymerization method such as the slurry or solution method, however, a preliminary drying is conducted by the centrifugal separation method, spray drying method or flash drying method to thereby obtain the solid polymer prior to the drying of the present invention.

Among these, the present invention is suitable for drying the solid polymer produced by the slurry polymerization or vapor phase polymerization.

Also, in the present invention, the product of modification of the above polymer can be subjected to the drying. This product is, for example, a product of chlorination, graft modification or maleic conversion.

In particular, it is preferred that the amount of solvent and unreacted polymerization feed materials which remain in the solid polymer to be subjected to the drying be not greater than 20% by weight.

In the step (i) of the present invention, a gaseous polymerization feed material is used as a drying gas and contacted with the solid polymer in the drying vessel.

The polymerization feed material employed as the drying gas preferably has a boiling point of not higher than 20° C. at the atmospheric pressure and is one having been used in the production of the solid polymer. When a plurality of polymerization feed materials are copolymerized in the polymer production, the drying gas may have the same composition as the polymerization feed materials although at least one of the polymerization feed materials may be used as the drying gas.

When one of the copolymerization feed materials is used as the drying gas, the material having a low boiling point is preferably used. For example, when an ethylene/1-butene copolymer is produced as the solid polymer, it is preferred that ethylene be employed as the drying gas.

In the above step (i), unreacted polymerization feed materials and solvent employed in the polymerization which remain in the solid polymer are purged and removed from the solid polymer by the contact of the solid polymer with the drying gas and recovered together with the drying gas.

In the present invention, part of the recovered drying gas can be recycled to the step (i). The recycled drying gas (recycle gas) may hydrogen and other compounds used in the polymerization. A lower boiling component of copolymerization feed materials, for example, ethylene may be newly added to the recycle gas before circulation.

Part or all of the drying gas recovered from the step (i) can be recycled to the polymerization step. When a copolymerization is carried out in the polymerization system, according to necessity, the recovered drying gas can be cooled to thereby effect condensation so that it is separated into nonvolatile components and volatile components before recycling to the copolymerization system.

An inert gas is used as the drying gas supplied to the step (ii). The inert gas is, for example, helium, nitrogen, argon, neon or a mixture thereof.

Although the drying gas supplied to the step (ii) may contain oxygen, it is preferred that the oxygen content of the drying gas be not greater than 5% by weight.

The drying gas supplied to the step (ii) may contain gaseous or liquid water. The drying gas may have a water content of 0.1 to 70% by weight, preferably, 1.0 to 50% by weight and, still preferably, 2.0 to 40% by weight.

In the above steps (i) and (ii) of the present invention, it is preferred that the solid polymer be countercurrently contacted with the drying gas. The above drying is preferably conducted at 40° to 120° C., especially, 60° to 110° C. and, still especially, 70° to 100° C. under a pressure of 0.0001 to 0.6 MPa, especially, 0.001 to 0.35 MPa and, still especially, 0.01 to 0.25 MPa. The apparatus cost would be lower when the pressure is over the atmospheric pressure (0.01 MPa).

With respect to the drying time, it is preferred that, in the step (i), the duration during which the drying gas (gaseous polymerization feed material) contacts the solid polymer (residence time) range from 0.5 min to 5 hr, especially, from 1 min to 3 hr, still especially, from 2 min to 2 hr and, further still especially, from 5 min to 1 hr. In the step (ii), it is preferred that the duration during which the drying gas (inert gas) contacts the solid polymer (residence time) range from 1 min to 3 hr, especially, from 1 min to 1 hr, still especially, from 2 min to 30 min and, further still especially, from 5 min to 20 min.

Part of the polymerization feed material employed as the drying gas is polymerized in the above step (i). This polymerization emits polymerization heat which warms the inner part of the solid polymer to thereby enhance degassing effect with the result that unreacted polymerization feed materials (monomers) and solvent can effectively be removed from the solid polymer. At that time, the polymerization feed material dissolved in the solid polymer also polymerizes, so that the amount of polymerization feed materials remaining in the solid polymer is more effectively reduced than in the drying with the use of an inert gas.

Thus, the monomer removal ratio of the step (i) is higher than in the drying with the use of an inert gas, so that the usage of expensive inert gas such as nitrogen can be reduced in the step (ii).

The drying gas recovered from the step (i) contains substantially no inert gas, so that it can be directly recycled to the polymerization system without causing the problem of accumulation of inert gas in the polymerization system. Therefore, it is unnecessary to blow polymerization gas into the atmosphere in order to remove inert gas from the polymerization system, so that the drying process of the invention can effectively recycle untreated gas and/or solvent and is favorable from the viewpoint of environmental protection.

The content of polymerization feed materials in the solid polymer to be dried in the step (ii) is reduced to a very low value, so that the danger of explosion is low. Thus, the drying gas employed in the step (ii) is not needed to be expensive inert gas such as highly purified nitrogen and may contain oxygen if the amount thereof is small. Therefore, the cost of the drying gas can be reduced.

Further, when water is used in the step (ii), the metallic catalyst component and cocatalyst remaining in the polymer can be inactivated, so that the reaction with a stabilizer used at the time of granulation can be inhibited to thereby enable preventing pellet coloring.

In the execution of the above drying according to the present invention, as long as it is feasible (i) to contact the gaseous polymerization feed material with the solid polymer and, thereafter, (ii) to contact the solid polymer with the inert gas, the step (i) and step (ii) may be performed in respective separated drying vessels (the separate vessel type apparatus) or may be performed in a single drying vesssel (the nonseparate vessel type apparatus).

Figure 1:
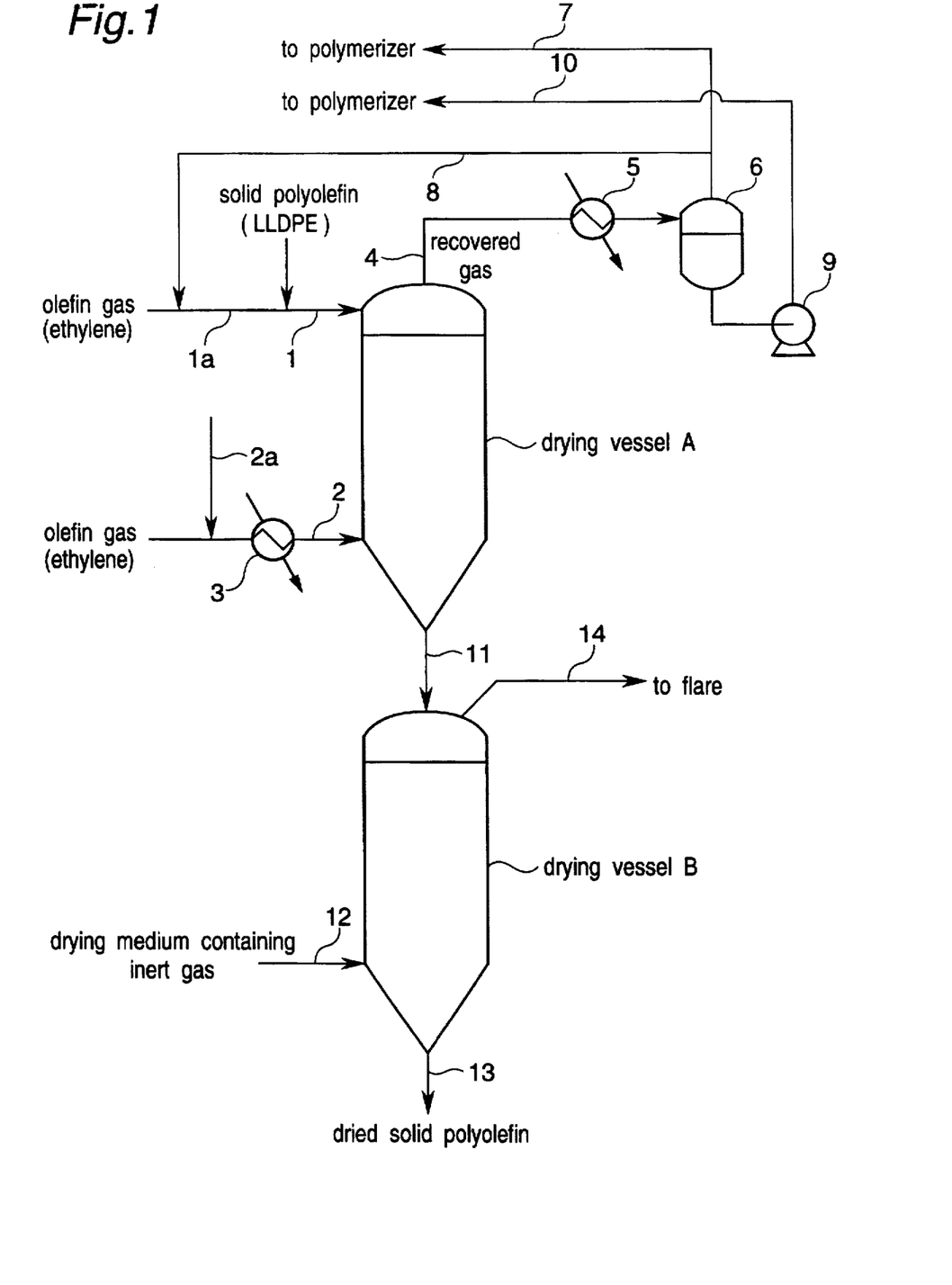
FIG. 1 is a schematic diagram showing a perferred embodiment of the method of drying a solid polymer according to the present invention which is performed by the use of a drying apparatus of the separate vessel type.

Although, for example, the below described drying apparatus according to the present invention can be used as the above apparatus of the nonseparate vessel type, first, a preferred embodiment of the method of drying a solid polymer according to the present invention will be illustrated with reference to an execution using a drying apparatus of the separate vessel type including two drying vessels (hoppers) connected in series with each other as shown in FIG. 1.

In the following description, for convenience, polyolefin (LLDPE) is used as the solid polymer.

Referring to FIG. 1, the solid polyolefin is led from an upper line 1 of a drying vessel A into the drying vessel A. An olefin gas (carrier gas) is fed from a line 1a into the line 1.

An olefin (for example, ethylene) gas (drying gas) heated by, for example, steam at a heater 3 is introduced through a lower line 2 into the drying vessel A.

In the drying vessel A, the solid polyolefin is countercurrently contacted with the olefin gas (step i).

The solid polyolefin is discharged from a bottom of the drying vessel A through a line 11 and led through a top of a drying vessel B into the drying vessel B.

On the other hand, a recovery gas discharged through a top line 4 from the drying vessel A is led through a cooler 5 into a condenser 6 in which the liquid phase is separated from the vapor phase. Separated high-boiling-point component (comonomer) is recycled from the condenser 6 through a line 10 into the polymerization system by the use of a compressor 9. Part of the gas (ethylene gas) is recycled through a line 7 into the polymerization system while the other ethylene gas is recycled through a line 8 and, for example, the line 1a into the drying vessel A.

In the drying vessel B, the solid polyolefin supplied through the line 11 from the drying vessel A is countercurrently contacted with an inert gas-containing drying gas fed through a lower line 12 of the drying vessel B (step ii).

The dried solid polyolefin is withdrawn through a line 13 from a bottom of the drying vessel B. The drying gas discharged through a line 14 at a top part of the drying vessel B is led to flare.

The drying gas discharged through the line 14 may be recycled to the drying vessel B.

Figure 2:
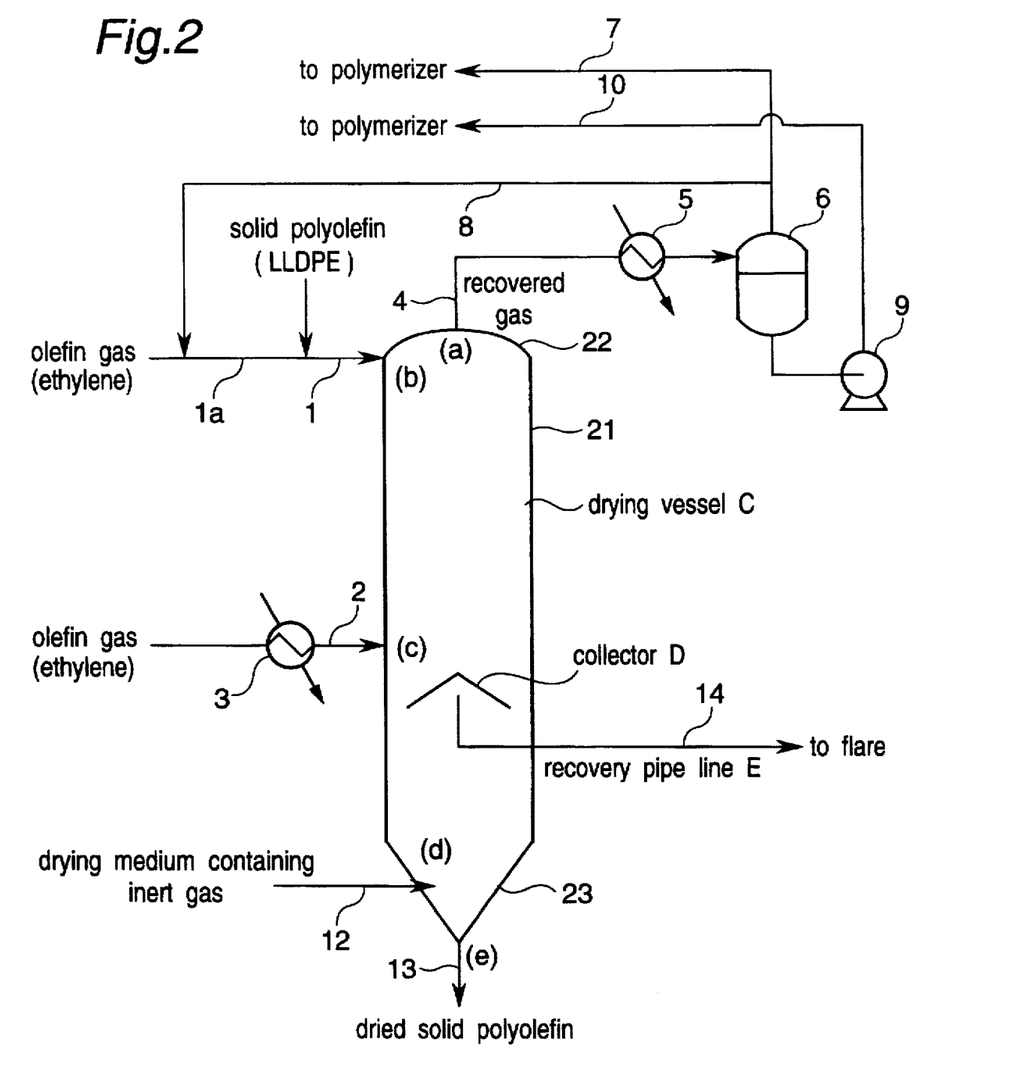
FIG. 2 is a schematic diagram showing an another embodiment of the method of drying a solid polymer according to the present invention, which is performed by the use of a drying apparatus of the nonseparate vessel type.

FIG. 2 shows the other embodiment of the method of drying a solid polymer according to the present invention in which the drying is performed by the use of the below described single drying vessel (the nonseparate vessel type apparatus) according to the present invention. In FIG. 2, the same numerals and marks as those in FIG. 2 indicate the same parts or portions as those in FIG. 3. The process of FIG. 2 is the same as that of FIG. 1 using the above drying vessels A and B except that use is made of the drying apparatus of the nonseparate vessel type in which a vessel C is used.

Although the embodiment in which the polyolefin (LLDPE) as the solid polymer is dried has been described above, it naturally in no way limit the scope of solid polymers which can be dried in the present invention.

Polymer drying apparatus

The apparatus for drying a solid polymer according to the present invention comprises a single drying vessel adapted to sequentially countercurrently contact a solid polymer with a first drying gas containing a polymerization feed material and a second drying gas containing an inert gas to thereby dry the solid polymer. The above apparatus comprises:

a drying vessel, a solid polymer supply port (b) disposed in the vicinity of a top of the drying vessel, a first drying gas supply port (c) disposed in a position below the solid polymer supply port (b) for supplying a first gas containing a gaseous polymerization feed materials, a first drying gas-discharging port (a) disposed at the top of the drying vessel for discharging the first drying gas which has been countercurrently contacted with the solid polymer, a second drying gas supply port (d) disposed in the vicinity of a bottom of the drying vessel for supplying a second drying gas containing an inert gas, a second drying gas collector D arranged within the drying vessel in a position between the first drying gas supply port (c) and the second drying gas supply port (d) for collecting the second drying gas which has been countercurrently contacted with the solid polymer, a recovery pipe line E extending from the second drying gas collector D to outside the drying vessel for leading the second drying gas which has been collected by the second drying gas collector D outside the drying vessel, and a solid polymer discharge port (e) disposed at the bottom of the drying vessel for recovering the solid polymer which has been dried by the countercurrent contacts with the first drying gas and the second drying gas.

Referring to FIGS. 2–5, the second drying gas collector D separate the inside of the drying vessel C so that a zone for contacting the solid polymer with the first drying gas to thereby dry the solid polymer is defined above the second drying gas collector D and that a zone for contacting the solid polymer with the second drying gas to thereby dry the solid polymer is defined below the second drying gas collector D.

It is preferred that the recovery pipe line E have a second drying gas recovering end positioned in the vicinity of a lower part of the second drying gas collector D, especially, positioned within the height of the second drying gas collector D.

The above drying vessel C is preferred to be a hopper-type drying vessel having a cylindrical part 21 provided at its top with a domed part 22 and at its bottom with a hopper part 23 having a reversed conical form.

In the above drying apparatus of the nonseparate vessel type, the residence time at each zone for contacting (contact zone) can be determined by the formula:

volume of each contact zone ($m^3$)/feed powder volume velocity ($m^3$/min).

In the above formula, each of volums and velocity are defined as follows.

1) volume of zone in which the solid polymer contacts the first drying gas ($m^3$):

It is defined as an internal volume (calculated under the assumption that a volume excluded by the collector D does not exist) of the drying vessel which extends from the lowest end of the collector D to polymer powder plane (its height is measured by a level gauge). Usually, it is deter-mined by the formula:

sectional area of a cylindrical part (m²)/polymer height from the lowest end of collector D (m).

The height of polymer powder plane can be measured by the use of any of paddle type, tuning fork type, ultrasonic type, load cell type and radiation (gamma ray) type level gauges.

2) volume of zone in which the solid polymer contacts the second drying gas (m³):

It is defined as an internal volume of the drying vessel which extends below the lowest end of the collector D. Usually, it is determined by the formula:

volume of a cylindrical part which extends below the lowest end of collector D (m³)+volume of a hopper part (m³).

3) feed powder volume velocity:

It is determined by the formula:

feed powder weight velocity/bulk density.

Figure 3:
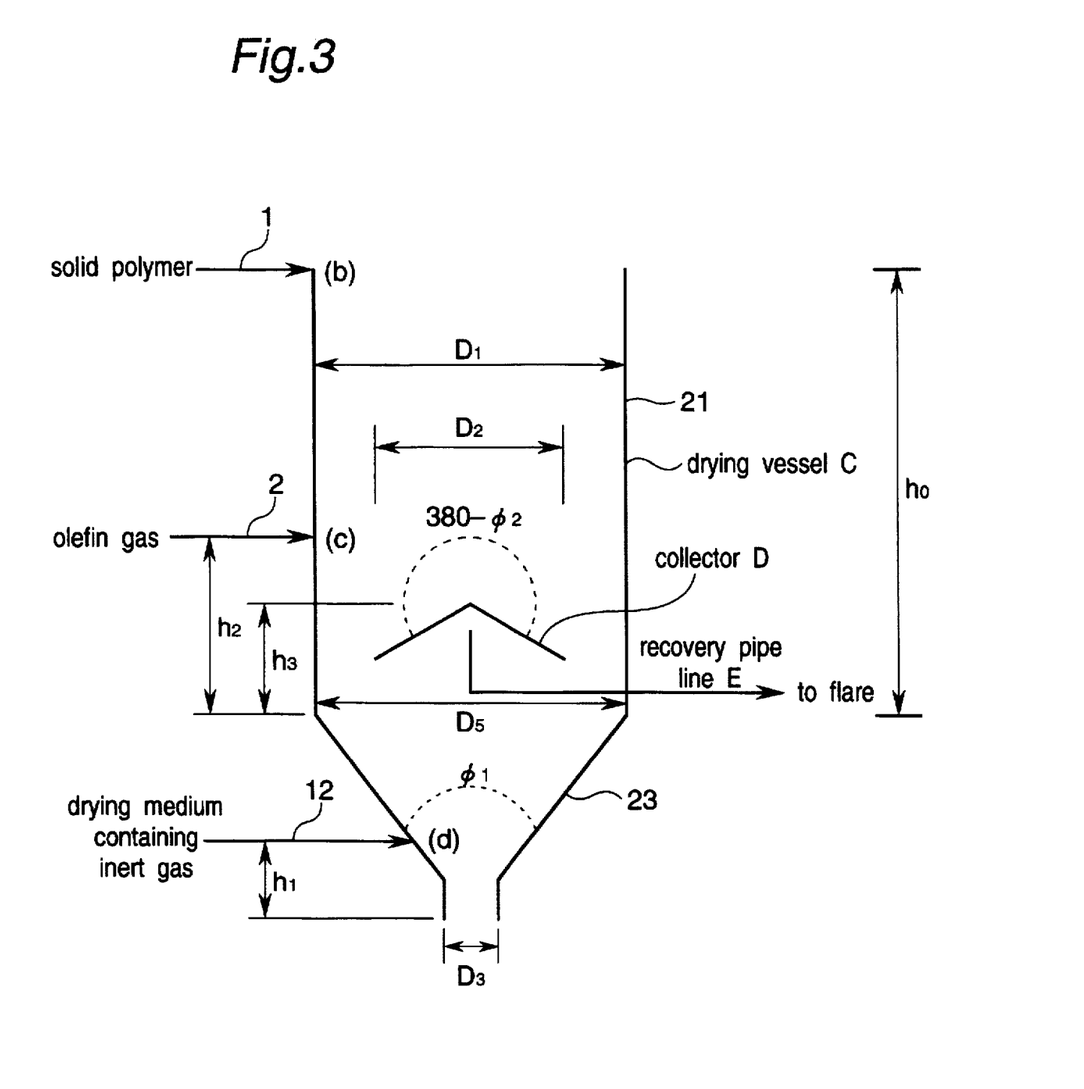
FIG. 3 is a schematic explanatory view showing an unseparate-type drying vessel in a preferred embodiment of the drying apparatus according to the present invention.

The second drying gas collector D may be composed of an umbrella shaped collecting member arranged in a center of the drying vessel so as to provide a spacing between the outer peripheral part of the umbrella shaped collecting member and an inner wall of the drying vessel (See FIG. 3).

The umbrella shaped collector D may have the form of a cone, a polygonal pyramid or a disc.

Figure 4:
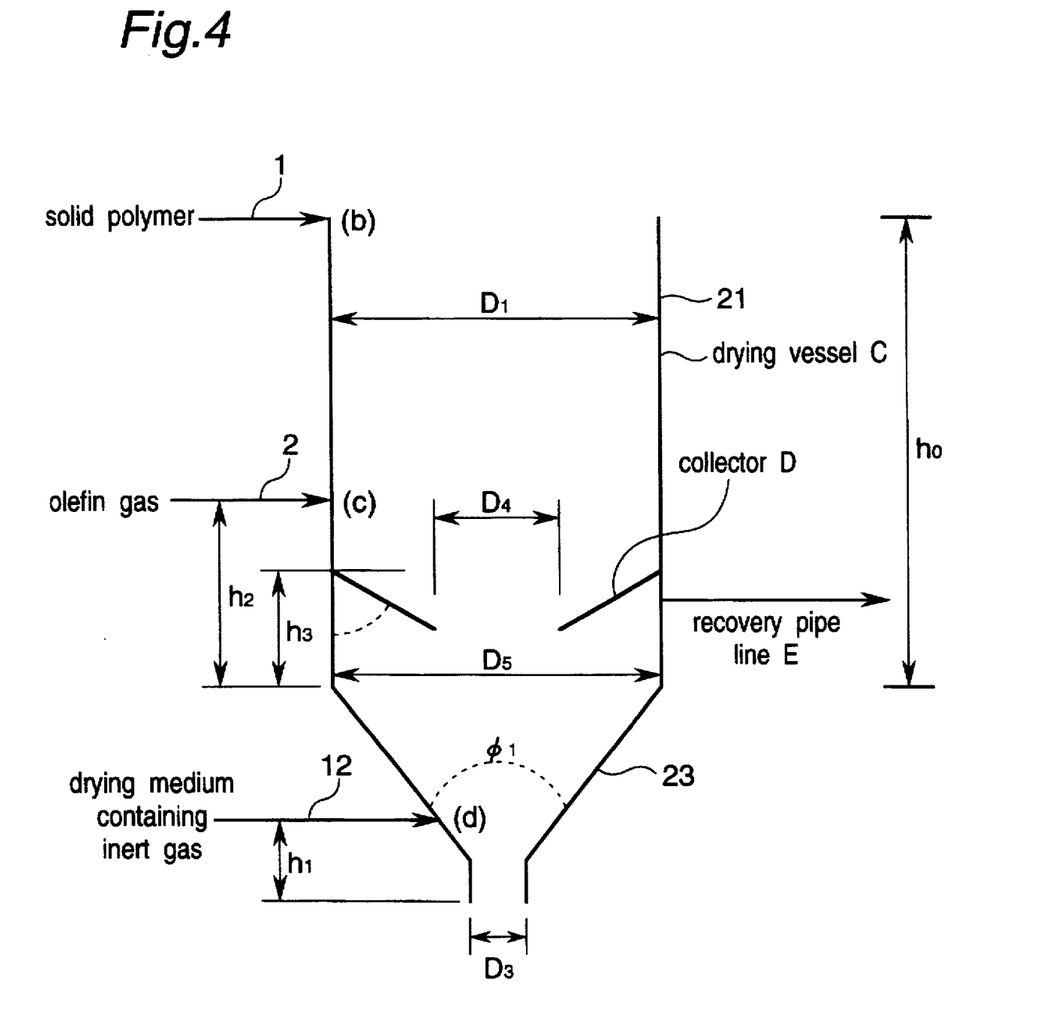
FIG. 4 is a schematic explanatory view showing an unseparate-type drying vessel in the other embodiment of the drying apparatus according to the present invention.

The second drying gas collector D may be composed of a protrudent plate disposed protrudently from an inner wall of the drying vessel toward a center axis of the drying vessel, the above protrudent plate having an opening at its center (See FIG. 4).

The protrudent plate may have an inverted conical or inverted polygonal pyramid form, each of which has an opening at its apex. Further, the protrudent plate may comprises a disc-form body having an opening at its center and a cylindrical part which extends below from the vicinity of the opening.

In the hopper-type drying apparatus having a cylindrical part whose cross section is circular at its upper part as shown in FIGS. 3 and 4, the hopper part (the dried polymer withdrawing part) arranged at the bottom of the vessel generally has a divergent angle $\Phi_1$ of 20° to 70°, preferably, 25° to 60° and, still preferably, 25° to 50°.

The collector D is preferred to have a divergent angle $\Phi_2$ of 20° to 120°, especially, 40° to 90° and, still especially, 50° to 90°.

When the collector has a sectional form as shown in FIG. 3, it is preferred that a ratio of $D_2/D_1$, in which $D_1$ represents an inside diameter of the cylindrical part and $D_2$ represents a maximum inside diameter of the collector D, range from 0.2 to 0.8, especially, from 0.3 to 0.6 and, still especially, from 0.4 to 0.55.

When $h_1$ represents the height from the dried polymer withdrawal port (e) to the second drying gas (inert gas) supply port (d) of the hopper part, it is preferred that a ratio of $h_1/D_1$, $D_1$ is the inside diameter of the cylindrical part, range from 0.05 to 0.5, especially, 0.1 to 0.3.

Further, when $h_2$ represents the height extending from the lowest end of the cylindrical part to the first drying gas (gaseous polymerization feed material) supply port (c) and $h_3$ represents the height extending from the lowest end of the cylindrical part to the top of the collector D, it is preferred that a ratio of $h_2/h_3$ range from 1.0 to 2.0, especially, from 1.1 to 1.7.

Still further, when $h_0$ represents the height extending from the lowest end of the cylindrical part to the solid polymer supply port (b) and when $D_1=D_5$ ($D_5$ is the maximum inside diameter of the hopper part), it is preferred that $h_0/h_3$ range from 2 to 20, especially, from 3 to 15 and, still especially, from 5 to 10.

When use is made of the collector D as shown in FIG. 4 whose minimum inside diameter is represented by $D_4$, it is preferred that $D_4/D_1$ range from 0.3 to 0.8, especially, from 0.4 to 0.6.

In FIG. 4, $\Phi_1$ and $\Phi_2$ have the same value ranges as those of the embodiment shown in FIG. 3, and $h_0$–$h_3$ and $D_1$–$D_4$ have the same relationships (ratios) with each other as those in the embodiment shown in FIG. 3.

Figure 5:
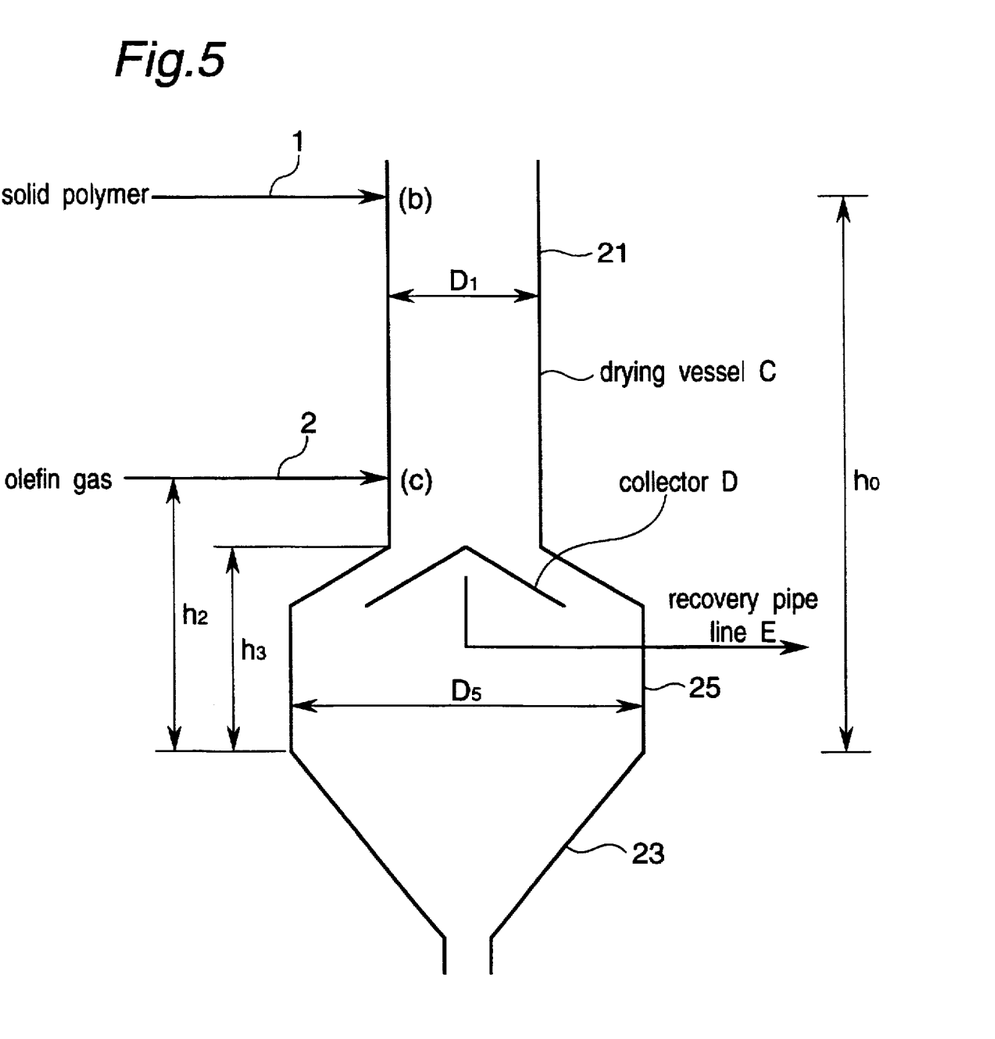
FIG. 5 is a schematic explanatory view showing an unseparate-type drying vessel in another embodiment of the drying apparatus according to the present invention.

The drying vessel is not limited to that having a shape of $D_1=D_2$ and may have a shape of an embodiment shown in FIG. 5. The drying vessel C of the embodiment shown in FIG. 5 comprises a greater diameter part 25 having an inside diameter $D_5$ between an cylindrical part 21 having an inside diameter $D_1$ and a hopper part 23, the above $D_5$ being greater than the above $D_1$.

In the above drying vessel C, it is preferred that the ratio of the inside diameter $D_1$ of the cylindrical part to the inside diameter $D_5$ of the greater diameter part ($D_1/D_5$), range from 0.2 to 0.7, especially, from 0.3 to 0.6.

In the drying vessel of $D_1 \neq D_5$ in the embodiment, it is preferred that a ratio of average residence time at height $h_0$ to average residence time at height $h_3$ range from 2 to 20, especially, from 3 to 15 and, still especially, from 5 to 10.

In the drying vessel of $D_1 \neq D_5$ of this embodiment, the greater diameter part of which $D_5$ is greater than $D_1$. However, in the present invention, a smaller diameter part of which diameter $D_5$ is smaller than $D_1$ can be disposed between the cylindrical part and the hopper part.

The configuration of the collector D is appropriately selected from among those mentioned above. When it is desirable to realize a piston flow at a zone where the drying is conducted by the gaseous polymerization feed material in the drying apparatus of the present invention, either the above angle $\Phi_2$ is set at 20° to 40° or a baffle plate can be provided. However, the piston flow is not necessarily preferred in a zone where the drying is conducted by the inert gas.

EFFECT OF THE INVENTION

The method of drying a solid polymer according to the present invention enables not only efficiently drying the solid polymer but also efficiently recovering any solvent and unreacted polymerization feed materials remaining in the solid polymer and easily recycling them to the polymerization system or drying apparatus.

Moreover, the use of the solid polymer drying apparatus of the present invention enables efficiently performing the above solid polymer drying using a single vessel.

EXAMPLE

The present invention will now be illustrated in greater detail with reference to the following Examples, which in no way limit the scope of the invention.

Examples 1 to 15

The solid polymers specified in Table 1 were dried and the results are given in Table 1.

Treatment results are shown as analytical results of high boiling point components (comonomer whose molecular weight is larger than that of principal reaction olefin, solvent, etc.) contained in the polymer.

Measuring method: Powdery polymer was extracted with methyl isobutyl ketone and the extract was quantitatively analyzed by a gas chromatography.

In Examples 1 to 4 and 10 to 13, the drying was performed in accordance with the process of FIG. 1 (apparatus of the separate vessel type).

In Examples 5 to 9, 14 and 15, the drying was performed in accordance with the process of FIG. 2 (apparatus of the nonseparate vessel type). Referring to FIG. 3, the drying apparatus of the nonseparate vessel type employed in Examples 5 to 9, 14 and 15 is outlined by the following values:

$\Phi_1=50°$, $\Phi_2=75°$ $D_1=0.35$ m, $D_2=0.175$ m, $D_3=0.075$ m $h_1=0.08$ m, $h_2=0.25$ m, $h_3=0.175$ m.

The polymer height was measured by the use of a gamma-ray level gauge (measuring instrument comprising a radiation source which emits gamma rays and a detection tube capable of detecting the gamma rays).

In each Examples 1–15, as a result of conducting the drying of polymers using the apparatuses as shown in FIGS. 1 and 2, there was observed no contamination of an inert gas derived from the second drying gas (the inert gas-containing drying gas) into the recovery gas discharged through line 4.

Moreover, in the production of polymers in Examples 1–15 with using the drying apparatuses of FIGS. 1 and 2, loss of monomers (including comonomers) could be reduced to approximately 40 by weight based on 100 of that in a production of polymers without using the drying apparatuses.

TABLE 1-1

| | Ex.1 | Ex.2 | Ex.3 | Ex.4 | Ex.5 |
|---|---|---|---|---|---|
| Solid polymer | | | | | |
| Type of polymer | LLDPE (linear low density polyethylene) | | | | |
| Polymn. feed mat'l | Ethylene/1-hexnene | | | | |
| Polymn. method | Vapor phase polymerization | | | | |
| State of catalyst at feed | Solid | | | | |
| MI (g/10 min) | 4.0 | 4.0 | | 4.0 | |
| Density (g/cm³) | 0.920 | 0.905 | | 0.920 | |
| Powder bulk sp.gr. (g/10 min) | 0.420 | 0.380 | | 0.420 | |
| Powder particle size (μm) | 1050 | 1150 | | 1050 | |
| Drying method | | | | | |
| Drying vessel | non-separate | non-separate | non-separate | non-separate | separate |
| Agitation in vessel | no | no | no | no | no |
| Pressure in vessel (Kg/cm³ · G) | 0.1 | 0.1 | 1.5 | 0.1 | 0.1 |
| do. Temperature (°C.) | 85 | 70 | 85 | 85 | 85 |
| 1st drying gas type | Ethylene (100%) | | Ethylene/H₂ (98%/2%) | | Ethylene (100%) |
| do. Flow rate (Nm³/hr) | | 20 | | 20 | 20 |
| do. Upper part res. time (m) | | 150 | | 30 | 150*1 |
| do. Lower part res. time (m) | | 30 | | 8 | 30 |
| 2nd drying gas type | N₂(100%) | | | | |
| do. Flow rate (Nm³/hr) | 5 | | | | |
| Treatment results | | | | | |
| High b.p. component in dried polymer | 1-hexene + i-pentene *2 | | | | |
| Concn. at vessel inlet (ppm) | 3000 | 8500 | 3200 | 3000 | 3500 |
| Concn. at vessel outlet (ppm) | 15 | 130 | 170 | 700 | 10 |

TABLE 1-2

| | Ex.6 | Ex.7 | Ex.8 | Ex.9 | Ex.10 |
|---|---|---|---|---|---|
| Solid polymer | | | | | |
| Type of polymer Polymn. feed mat'l | LLDPE (linear low density polyethlene) Ethylene/1-hexnene | | | LLDPE (ethylene/1-butene) | HDDE (ethylene/1-hexene) |
| Polymn. method | Vapor phase polymerization | | | | hexane slurry polymn. |
| State of catalyst at feed | Solid | | | | |
| MI (g/10 min) | 4.0 | 4.0 | 2.0 | | 8.0 |
| Density (g/cm³) | 0.905 | 0.920 | 0.930 | | 0.966 |
| Powder bulk sp.gr. (g/10 min) | 0.385 | 0.420 | 0.440 | | 0.450 |
| Powder particle size (μm) | 1250 | 1050 | 900 | | 350 |
| Drying method | | | | | |
| Drying vessel | separate | separate | separate | separate | non-separate |
| Agitation in vessel | done | done | no | no | done |
| Pressure in vessel (Kg/cm³ · G) | 0.1 | 0.1 | 0.1 | 0.1 | 0.1 |
| do. Temperature (°C.) | 70 | 50 | 90 | 85 | 115 |
| 1st drying gas type | Ethylene (100%) | Ethylene/H₂ (95%/5%) | recycle gas*3 + ethylene | | Ethylene/H₂ (85%/15%) |
| do. Flow rate (Nm³/hr) | 20 | 25 | 20 | | 150 |
| do. Upper part res. time (m) | 150 *1 | 150 *1 | 75*1 | | 60 |
| do. Lower part res. time (m) | 30 | 30 | 15 | | 15 |
| 2nd drying gas type | N₂(100%) | N₂ + O₂ (96.5%/3.5%) | N₂ + steam (90%/10%) | | N₂ |
| do. Flow rate (Nm³/hr) | 5 | 5 | 5 | | 5 |
| Treatment results | | | | | |
| High b.p. component in dried polymer | 1-hexene + i-pentene *2 | | 1-hexene | 1-butene + i-pentene *2 | n-hexane *6 |
| Concn. at vessel inlet (ppm) | 9000 | 9000 | 3800 | 1500 | 35000 |
| Concn. at vessel outlet (ppm) | 80 | 1200 | 20 | 30 | 10 |

TABLE 1-3

| | Ex.11 | Ex.12 | Ex.13 | Ex.14 | Ex.15 |
|---|---|---|---|---|---|
| Solid polymer | | | | | |
| Type of polymer | homopoly propylene | block polypropylene | | | |
| Polymn. feed mat'l | propylene | propylene/ethylene | | | |
| Polymn. method | Vapor phase polymerization | | | | |
| State of catalyst at feed | hexane slurry | | | | |
| MI (g/10 min) | 7.5 | 1.5 | | 24 | |
| Density (g/cm³) | — | — | | — | |
| Ethylene content (mol %) | 0 | 18 | | 17 | |
| Powder bulk sp. gr. (g/10 min) | 0.480 | 0.475 | | 0.470 | |
| Powder particle size (μm) | 630 | 00 | | 650 | |

TABLE 1-3-continued

| | Ex.11 | Ex.12 | Ex.13 | Ex.14 | Ex.15 |
|---|---|---|---|---|---|
| Drying method | | | | | |
| Drying vessel | non-separate | non-separate | | separate | |
| Agitation in vessel | done | done | | done | |
| Pressure in vessel (Kg/cm$^3$ · G) | 0.15 | 2.1 | | 2.1 | |
| do. Temperature (°C.) | 110 | 100 | | 100 | |
| 1st drying gas type | Propylene (100%) | Ethylene (100%) | | Recycle gas*4 + ethylene | Recycle gas*5 + ethylene |
| do. Flow rate (Nm$^3$/hr) | 25 | 28 | | 28 | |
| do. Upper part res. time (m) | 20 | 20 | | 20*1 10 | |
| do. Lower part res. time (m) | 5 | 5 | | 5 | |
| 2nd drying gas type | $N_2$ | | | $N_2 + H_2O$ (62.5%, 37.5%) | |
| do. Flow rate (Nm$^3$/hr) | 5 | | | 8 | |
| Treatment results | | | | | |
| High b.p. component in dried polymer | | | n-hexane | | |
| Concn. at vessel inlet (ppm) | 3800 | 3300 | 2700 | 3500 | 2800 |
| Concn. at vessel outlet (ppm) | 70 | 25 | 20 | 15 | 10 |

*1: Residence time in first purge vessel when use is made of an apparatus of the separate purge vessel type.
*2: i-pentene: polymerization medium used at the time of vapor phase polymerization.
*3: recycle gas+ethylene: composition (96.3% of ethylene+ 2% of $H_2$+2% of 1-butene).
*4: recycle gas+ethylene: composition (76.3 mol % of ethylene+0.2 mol % of $H_2$+23.5 mol % of propylene).
*5: recycle gas+ethylene: composition (68.5 mol % of ethylene+3.1 mol % of $H_2$+28.4 mol % of propylene).
*6: preliminarily dried.

What is claimed is:

1. An apparatus for drying a solid polymer which comprises:

a drying vessel, a solid polymer supply port (b) disposed in the vicinity of a top of the drying vessel, a first drying gas supply port (c) disposed in a position below the solid polymer supply port (b) for supplying a first gas containing a gaseous polymerization feed materials, a first drying gas-discharging port (a) disposed at the top of the drying vessel for discharging the first drying gas which has been countercurrently contacted with the solid polymer, a second drying gas supply port (d) disposed in the vicinity of a bottom of the drying vessel for supplying a second drying gas containing an inert gas, a second drying gas collector D arranged within the drying vessel in a position between the first drying gas supply port (c) and the second drying gas supply port (d) for collecting the second drying gas which has been countercurrently contacted with the solid polymer, a recovery pipe line E extending from the second drying gas collector D to outside the drying vessel for leading the second drying gas which has been collected by the second drying gas collector D outside the drying vessel, and a solid polymer discharge port (e) disposed at the bottom of the drying vessel for recovering the solid polymer which has been dried by the countercurrent contacts with the first drying gas and the second drying gas, wherein the second drying gas collector D separate inside of the drying vessel so that a zone for contacting the solid polymer with the first drying gas is defined above the second drying gas collector D and that a zone for contacting the solid polymer with the second drying gas is defined below the. second drying gas collector D.

2. The drying apparatus as claimed in claim 1, wherein the recovery pipe line E has a second drying gas recovering end positioned in the vicinity of a lower part of the second drying gas collector D.

3. The drying apparatus as claimed in claim 1 or 2, wherein the drying vessel is a hopper-type drying vessel having a cylindrical body part provided at its top with a domed part and at its bottom with a hopper part having a reversed conical form.

4. The drying apparatus as claimed in claim 1, wherein the second drying gas collector D is composed of a protrudent plate disposed protrudently from an inner wall of the drying vessel toward a center axis of the drying vessel, said protrudent plate having an opening at its center.

5. The drying apparatus as claimed in claim 4, wherein the protrudent plate has an inverted conical or inverted polygonal pyramid form, each of which has an opening at the apex.

6. The drying apparatus as claimed in claim 4, wherein the protrudent plate comprises a disc-form body having an opening at its center and a cylindrical part which extends below from the vicinity of the opening.

7. The drying apparatus as claimed in any of claims 4 to 6, wherein a ratio of $D_4/D_1$, in which $D_1$ represents an inside diameter of the cylindrical part and $D_4$ represents a minimum inside diameter of the opening of the second drying gas collector D, ranges from 0.3 to 0.8.

8. The drying apparatus as claimed in claim 1, wherein the second drying gas collector D is composed of an umbrella shaped collecting member arranged in a center of the drying vessel so as to provide a spacing between an outer peripheral part of the umbrella shaped collecting member and an inner wall of the drying vessel.

9. The drying apparatus as claimed in claim 8, wherein the umbrella shaped collector D has the form of a cone, a polygonal pyramid or a disc.

10. The drying apparatus as claimed in claim 8 or 9, wherein a ratio of $D_2/D_1$, in which $D_1$ represents an inside diameter of the cylindrical part and $D_2$ represents a maximum inside diameter of the second drying gas collector D, ranges from 0.2 to 0.8.

11. The drying apparatus as claimed in claim 2 wherein the drying vessel comprises a greater diameter part having an inside diameter $D_5$ disposed between an cylindrical part having an inside diameter $D_1$ and a hopper part, the above $D_5$ being greater than the above $D_1$ a ratio of $D_1/D_5$ ranges from 0.2 to 0.7.

* * * * *

UNITED STATES PATENT AND TRADEMARK OFFICE
CERTIFICATE OF CORRRECTION

PATENT NO. : 5,799,412
DATED : Sep. 1, 1998
INVENTOR(S) : Yamamoto et al.

It is certified that error appears in the above-identified patent and that said Letters Patent is hereby corrected as shown below:

Title page, item [56], insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 5 | 4 | 7 | 1 | 5 | 1 | 10/1985 | Takeda | | | |
| | | 5 | 1 | 9 | 9 | 1 | 8 | 4 | 04/1993 | Rosse | | | |
| | | | | | | | | | | | | | |

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | | 6 | 6 | 5 | 4 | 7 | 3 | A5 | 05/1988 | Switzerland | | | | |
| | | | | | | | | | | | | | | |

Signed and Sealed this

Thirteenth Day of April, 1999

Attest:

Q. TODD DICKINSON

*Attesting Officer*       *Acting Commissioner of Patents and Trademarks*